US012394888B2

(12) United States Patent
Liu et al.

(10) Patent No.: US 12,394,888 B2
(45) Date of Patent: Aug. 19, 2025

(54) WEARABLE DEVICE

(71) Applicant: HUAWEI TECHNOLOGIES CO., LTD., Shenzhen (CN)

(72) Inventors: Bing Liu, Xi'an (CN); Menglong Zhao, Dongguan (CN); Jianming Gao, Xi'an (CN); Xiaoyu Sun, Shenzhen (CN); Yuchan Yang, Shanghai (CN); Chien-Ming Lee, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 433 days.

(21) Appl. No.: 18/009,445

(22) PCT Filed: Jun. 9, 2021

(86) PCT No.: PCT/CN2021/099193
§ 371 (c)(1),
(2) Date: Dec. 9, 2022

(87) PCT Pub. No.: WO2022/001607
PCT Pub. Date: Jan. 6, 2022

(65) Prior Publication Data

US 2023/0231302 A1 Jul. 20, 2023

(30) Foreign Application Priority Data

Jun. 30, 2020 (CN) ......................... 202010617434.1

(51) Int. Cl.
*H01Q 1/27* (2006.01)
*G04G 17/04* (2006.01)
*H01Q 1/50* (2006.01)

(52) U.S. Cl.
CPC ............. *H01Q 1/273* (2013.01); *G04G 17/04* (2013.01); *H01Q 1/50* (2013.01)

(58) Field of Classification Search
CPC .......... H01Q 1/273; H01Q 1/50; H01Q 13/10; H01Q 9/0421; H01Q 9/30; H01Q 21/28; G04G 17/04; G04G 17/045; G04R 60/12
See application file for complete search history.

(56) References Cited

U.S. PATENT DOCUMENTS

2010/0156741 A1 6/2010 Vazquez et al.
2016/0006110 A1 1/2016 Jain et al.
(Continued)

FOREIGN PATENT DOCUMENTS

CA 2231103 A1 10/1998
CN 103676631 A 3/2014
(Continued)

*Primary Examiner* — Renan Luque

(57) ABSTRACT

This application provides a wearable device. The wearable device includes a cover, a screen component, an antenna bracket, a first antenna, a metal middle frame, a circuit board, and a bottom cover. The cover and the bottom cover are respectively connected to two sides of the metal middle frame, the screen component is connected to a side of the cover facing the bottom cover, and the circuit board is located in a space enclosed by the metal middle frame, the screen component, and the bottom cover. An accommodating space is jointly enclosed by an end of the screen component, an inner wall of the metal middle frame, and an inner wall of the cover, the antenna bracket is disposed in the accommodating space, and the first antenna is disposed on the antenna bracket and is connected to the circuit board by using a feedpoint.

20 Claims, 19 Drawing Sheets

(56) References Cited

U.S. PATENT DOCUMENTS

| | | | | |
|---|---|---|---|---|
| 2017/0133752 | A1 | 5/2017 | Choi et al. | |
| 2017/0214422 | A1 | 7/2017 | Na et al. | |
| 2018/0083342 | A1* | 3/2018 | Lepe | H01Q 1/243 |
| 2018/0181079 | A1 | 6/2018 | Katsuda et al. | |
| 2018/0287248 | A1 | 10/2018 | Han et al. | |
| 2019/0131696 | A1 | 5/2019 | Hanshew et al. | |
| 2019/0363428 | A1 | 11/2019 | Zhu et al. | |
| 2020/0194905 | A1 | 6/2020 | Wei et al. | |
| 2020/0243952 | A1* | 7/2020 | Zhu | G04R 60/02 |

FOREIGN PATENT DOCUMENTS

| | | | |
|---|---|---|---|
| CN | 205723918 | U | 11/2016 |
| CN | 206546881 | U | 10/2017 |
| CN | 107809002 | A | 3/2018 |
| CN | 109755723 | A | 5/2019 |
| CN | 110168804 | A | 8/2019 |
| CN | 107112627 | B | 12/2019 |
| CN | 111029731 | A | 4/2020 |
| CN | 107925156 | B | 2/2021 |
| JP | 2014062852 | A | 4/2014 |

* cited by examiner

WEARABLE DEVICE

CROSS-REFERENCE TO RELATED APPLICATIONS

This application is a National Stage of International Application No. PCT/CN2021/099193, filed on Jun. 9, 2021, which claims priority to Chinese Patent Application No. 202010617434.1, filed on Jun. 30, 2020, both of which are hereby incorporated by reference in their entireties.

This application claims priority to Chinese Patent Application No. 202010617434.1, filed with the China National Intellectual Property Administration on Jun. 30, 2020 and entitled "WEARABLE DEVICE", which is incorporated herein by reference in its entirety.

TECHNICAL FIELD

This application relates to the field of intelligent wearable technologies, and in particular, to a wearable device.

BACKGROUND

Wearable devices are increasingly popular among users because of portability and intelligence of the wearable devices. A smart watch is one of most commonly used wearable devices. A communication function is integrated into the smart watch, and therefore an antenna needs to be disposed to transmit or receive an electromagnetic signal. The smart watch is quite small in volume, and there are increasing requirements for quantities and types of antennas. Therefore, it is quite difficult to properly use space of the smart watch to implement an antenna design.

SUMMARY

Embodiments of this application provide a wearable device, so that space inside a wearable body can be properly used to implement an antenna design.

According to a first aspect, an embodiment of this application provides a wearable device, including a wearable body, where the wearable body includes a cover, a screen component, an antenna bracket, a first antenna, a metal middle frame, a circuit board, and a bottom cover; the cover and the bottom cover are respectively connected to two sides of the metal middle frame, the screen component is connected to a side of the cover facing the bottom cover, and the circuit board is located in space enclosed by the metal middle frame, the screen component, and the bottom cover; and accommodating space is jointly enclosed by an end of the screen component, an inner wall of the metal middle frame, and an inner wall of the cover, the antenna bracket is disposed in the accommodating space, and the first antenna is disposed on the antenna bracket and is connected to the circuit board by using a feedpoint.

According to the wearable device provided in this embodiment of this application, the antenna is disposed in the accommodating space between the screen component and the metal middle frame, so that space inside the wearable device can be properly used, and a multi-antenna design in the wearable device can be implemented. In addition, the first antenna disposed in the accommodating space is away from a user arm and a component in the wearable body, so that impact on antenna performance that is caused by human body absorption and a metal component can be reduced.

In a possible implementation, the antenna bracket is fastened to the metal middle frame and/or the cover.

The antenna bracket may be fastened to the metal middle frame or the cover, provided that the antenna bracket is located in the accommodating space and is securely connected.

In a possible implementation, the antenna bracket includes a bracket body and a cabling part, the bracket body is annular, the cabling part is disposed on a part of a length of the bracket body through protrusion, and a metal cable is disposed on the cabling part to form the first antenna.

It is easy to assemble and disassemble the annular bracket body, and the metal cable is disposed on the cabling part by using a laser direct structuring technology for easy processing.

In a possible implementation, a height of the cabling part in a thickness direction of the wearable body is not less than a height of the metal middle frame.

The cabling part is flush with or higher than an upper edge of the metal middle frame, thereby reducing impact on the metal antenna on the cabling part that is caused by the metal middle frame. In addition, the cabling part is as far away from the circuit board as possible and as close to the cover as possible, to minimize impact on the first antenna that is caused by metal components such as the screen component and the circuit board inside the wearable body. In addition, when the wearable body is worn on the user arm, the first antenna is away from the arm, and is little subject to human body absorption, and degradation of antenna performance that is caused by a human body is small.

In a possible implementation, the antenna bracket further includes an extension part, the extension part is formed by extending the bracket body in a direction of approaching the metal middle frame, a locking protrusion is disposed on the inner wall of the metal middle frame, and the extension part is glued between the cover and an upper surface of the locking protrusion.

The antenna bracket is glued between the cover and the locking protrusion by using the extension part, so that both reliable fastening and waterproofing can be implemented.

In a possible implementation, the first antenna includes a first radiator and/or a second radiator, the first radiator is a global navigation satellite system (GNSS) antenna, a first feedpoint is disposed on the first radiator, the second radiator is a Bluetooth (BT)/Wi-Fi antenna, and a second feedpoint is disposed on the second radiator.

The first antenna disposed on the antenna bracket is affected by a peripheral component, has a relatively short length, and is affected by a metal component to a small extent, and therefore is suitable to be designed as a high-band antenna.

In a possible implementation, the first antenna is a metal cable plated on the antenna bracket; the first antenna is a metal piece built in the antenna bracket; or the first antenna is a flexible printed circuit attached to the antenna bracket.

There are a plurality of implementations of the first antenna disposed on the antenna bracket, and a metal cable, a metal insert, and a flexible printed circuit may all be used as the first antenna.

In a possible implementation, the first antenna is fed by using a spring plate, a screw, or a metal sheet.

The first antenna and the main circuit board are connected by using an electric-conductor such as a spring plate, a screw, or a metal sheet, to smoothly implement feeding. The main circuit board may be fastened to the metal middle frame by using a fastener such as a screw, to ensure reliability of fastening the main circuit board inside the wearable body. In addition, the antenna may be fed and grounded by using the screw, so that a quantity of parts is reduced, thereby improving overall space utilization of the wearable device.

In a possible implementation, a width of the first antenna is 0.6 mm to 0.8 mm.

Because of the width of the first antenna, processing molding and consistency are ensured, and there are large distances between the first antenna and the metal middle frame and between the first antenna and the screen component, so that impact on performance of the first antenna that is caused by the metal middle frame and the screen component can be reduced.

In a possible implementation, there is a slot between the circuit board and the metal middle frame, the circuit board is separately connected to a first ground point, a second ground point, and the metal middle frame by using a third feedpoint, and a second antenna is formed by the circuit board, the metal middle frame, and the slot between the circuit board and the metal middle frame.

The slot antenna is designed by using the slot between the main circuit board and the metal middle frame without disposing slots on the metal middle frame and the bottom cover, so that an aesthetic appearance of the wearable body is improved and better visual experience is provided to a user. In addition, this facilitates processing and assembling of a housing of the wearable body and a waterproof design of the entire system. A coexistence design of the first antenna and the second antenna can resolve problems of antenna bandwidth implementation and communications standard-based division, and can better reduce a radio frequency channel insertion loss and improve antenna performance.

In a possible implementation, the second antenna is a cell antenna and/or a GNSS antenna.

The second antenna may generate $n\lambda/2$ resonance, covering a low frequency, an intermediate frequency, and a high frequency, and the second antenna is affected by the metal middle frame and a metal component in the wearable body to a relatively small extent, and therefore is suitable to be used as a low-band antenna.

In a possible implementation, the metal middle frame is grounded by using a tuning inductor or capacitor.

The inductor or the capacitor is connected to load/unload a resonant strong electric field area or strong current area, so that a resonance frequency ratio can be adjusted to extend a coverage band of the second antenna.

In a possible implementation, a third ground point is further disposed between the circuit board and the metal middle frame, and the third ground point is located between the third feedpoint and the second ground point.

The third ground point is disposed, and an inductor or a capacitor is connected at the third ground point, so that a resonance frequency ratio can be adjusted to extend a coverage band of the second antenna.

In a possible implementation, a width of the slot is 0.5 mm to 1.8 mm.

The width of the slot is far less than a wavelength corresponding to a resonance frequency of the slot antenna. Being limited by component arrangement in the wearable body, the width of the slot is relatively small, so that a condition for forming the slot antenna can be met.

According to a second aspect, an embodiment of this application provides a wearable device, including a wearable body, where the wearable body includes a display, a second antenna, a metal middle frame, a circuit board, and a bottom cover; the display and the bottom cover are respectively connected to two sides of the metal middle frame, and the circuit board is located in space enclosed by the metal middle frame, the display, and the bottom cover; and there is a slot between the circuit board and the metal middle frame, the circuit board is separately connected to a first ground point, a second ground point, and the metal middle frame by using a third feedpoint, and a second antenna is formed by the circuit board, the metal middle frame, and the slot between the circuit board and the metal middle frame.

The slot antenna is designed by using the slot between the main circuit board and the metal middle frame without disposing slots on the metal middle frame and the bottom cover, so that an aesthetic appearance of the wearable body is improved and better visual experience is provided to a user. In addition, this facilitates processing and assembling of a housing of the wearable body and a waterproof design of the entire system.

In a possible implementation, the second antenna is a cell antenna and/or a GNSS antenna.

In a possible implementation, a third ground point is further disposed between the circuit board and the metal middle frame, and the third ground point is located between the third feedpoint and the second ground point.

In a possible implementation, the metal middle frame is grounded by using a tuning inductor or capacitor.

In a possible implementation, a width of the slot is 0.5 mm to 1.8 mm.

In a possible implementation, the second antenna is fed by using a spring plate, a screw, or a metal sheet.

DESCRIPTION OF REFERENCE NUMERALS

100—Wearable body; 11—Metal middle frame; 111—Limiting step; 12—Cover; 13—Screen component; 131—Polarizer; 132—Touch layer; 133—Display panel; 134—Substrate; 135—Flexible printed circuit; 1351—First outgoing line; 1352—Second outgoing line; 1353—First bend; 1354—Second bend; 136—Optical clear adhesive; 14—Bottom cover; 15—Main circuit board; 151—Wiring part; 16—Battery;

200—First antenna; 21—Antenna bracket; 210—Bracket body; 211—Extension part; 212—Cabling part; 213—Conductive via; 214—Spring plate; 22—First radiator; 221—First feedpoint; 23—Second radiator; 231—Second feedpoint;

300—Second antenna; 31—Third feedpoint; 32—First ground point; 33—Second ground point;

400—Watch strap connection component; 51—First key; 52—Second key.

DESCRIPTION OF EMBODIMENTS

It should be noted that, in the embodiments of this application, a wearable device may be an electronic device such as a smart watch or a smart band. Taking the watch as an example, a front side of the watch is a display surface, and a back side of the watch is a side that is close to a user arm. In the accompanying drawings of the embodiments of this application, a positive direction of a Z-axis is a direction from the back side to the front side of the watch in a thickness direction, a positive direction of an X-axis is a direction from a nine-o'clock position to a three-o'clock position of the watch, and a positive direction of a Y-axis is a direction from a six-o'clock position to a twelve-o'clock position of the watch.

Figure 1:
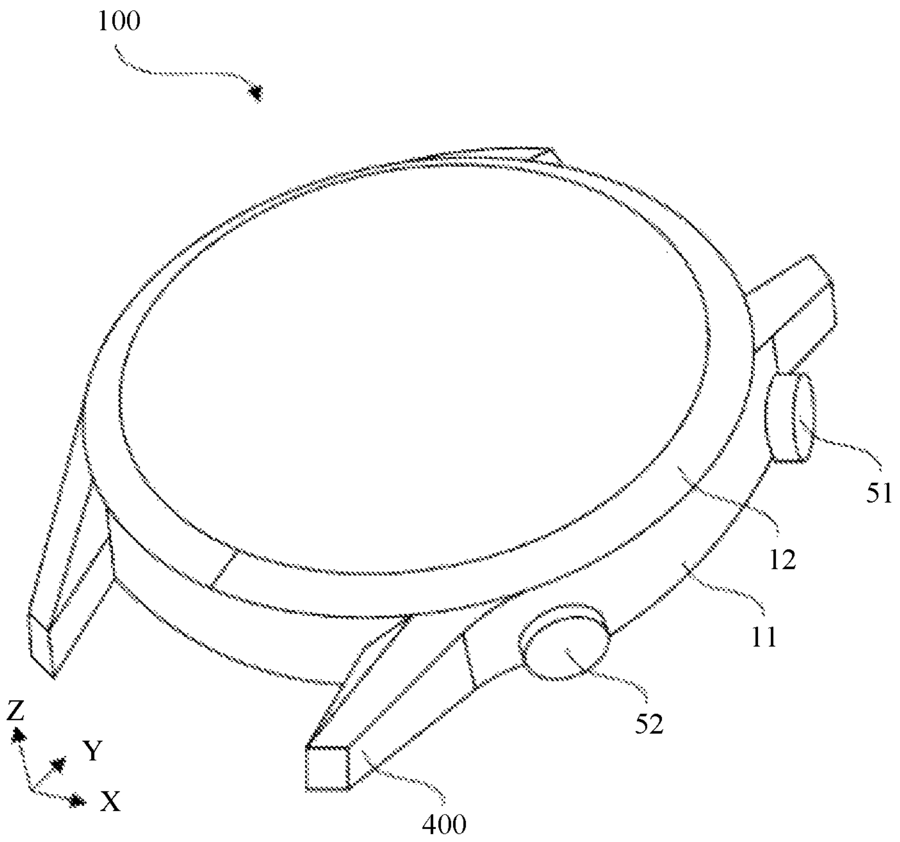
FIG. 1 is a schematic diagram of a structure of a wearable device according to an embodiment of this application.

FIG. 1 is a schematic diagram of a structure of a wearable device according to an embodiment of this application. As shown in FIG. 1, the wearable device provided in this embodiment of this application may include a wearable body 100 and a watch strap (not shown in the figure). The wearable body 100 and the watch strap are detachablely connected by using a watch strap connection component 400, to facilitate removal, repair, and replacement of the watch strap, or the wearable body 100 and the watch strap may be integrated.

The wearable body 100 includes a housing and a display that is disposed on a front side of the housing and that plays a display role. The housing includes a metal middle frame 11 and a bottom cover. The metal middle frame 11 is an annular middle frame, the bottom cover is connected to a back side of the metal middle frame 11, the display is connected to a front side of the metal middle frame 11, and interior space for accommodating components such as a main circuit board and a battery is jointly enclosed by the bottom cover, the metal middle frame 11, and the display.

The metal middle frame 11 has advantages such as high structural strength, a beautiful aesthetic appearance, and being able to be used as an antenna. A shape of the metal middle frame 11 is not specifically limited. In this embodiment of this application, for example, the metal middle frame 11 is a circle, and an outer diameter size of the metal middle frame 11 may fall between 38 mm and 48 mm, for example, may be 42 mm or 46 mm. It is easy to understand that the metal middle frame 11 may be alternatively an ellipse, a rectangle, or a polygon.

The watch strap connection component 400 is connected to the metal middle frame 11, and may be integrated with the metal middle frame 11. Amounting hole may be disposed on a side wall of the metal middle frame 11, to install a key. For example, a first key 51 and a second key 52 are connected to the side wall of the metal middle frame 11, and are respectively used as a power key and a function key. The first key 51 and the second key 52 may be respectively disposed near a two-o'clock position and a four-o'clock position of the wearable body 100, conforming to an operation habit of most users and facilitating a user operation.

The display includes a screen component and a cover 12 that covers a surface of the screen component. The cover 12 has a function of protecting the screen component. For example, the display may be a liquid crystal display, a light emitting diode display, an organic light emitting diode display, a micro-electro-mechanical system display, or an electronic paper display. The display may be configured to display various types of content such as texts, images, videos, icons, and symbols to a user. The display may include a touchscreen, configured to receive touch input, gesture input, proximity input, or hover input of an electronic stylus or a hand of the user.

Figure 2:
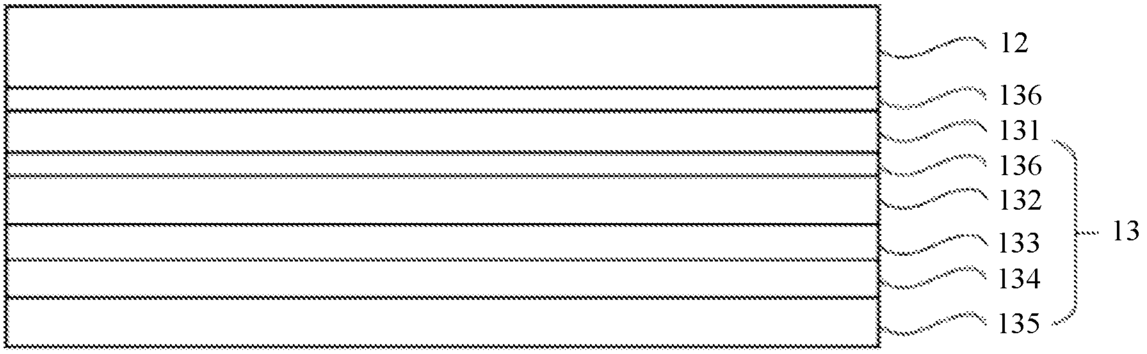
FIG. 2 is a schematic diagram of a structure of a film layer of a display according to an embodiment of this application.

FIG. 2 is a schematic diagram of a structure of a film layer of a display according to an embodiment of this application. As shown in FIG. 2, the display includes the cover 12 and a screen component 13, the cover 12 is glued above the screen component 13 by using an optical clear adhesive, and the screen component 13 includes a display panel 133, a touch layer 132, and a polarizer 131 stacked above a substrate 134. Two adjacent layers of structures may be connected by using an optical clear adhesive 136.

The display panel 133 may be an organic light-emitting diode (organic light-emitting diode, OLED), and the touch layer 132 and the display panel 133 may be separated, or the touch layer 132 and the display panel 133 may be integrated.

The screen component 13 further includes a flexible printed circuit (flexible printed circuit, FPC) 135. Both the touch layer 132 and the display panel 133 need to be electrically connected to the main circuit board inside the wearable body 100 by using the flexible printed circuit 135. For example, when the touch layer 132 and the display panel 133 are separated, the touch layer 132 and the display panel 133 may be separately connected to the main circuit board by using the flexible printed circuit 135. The flexible printed circuit 135 is a highly reliable flexible printed circuit made by using a polyimide or a polyimide film as a substrate. The flexible printed circuit 135 has a good bending attribute. After being connected to the touch layer 132 and the display panel 133, the flexible printed circuit 135 may be bent below the substrate 134, and then connected to the main circuit board below the screen component 13.

Figure 3:
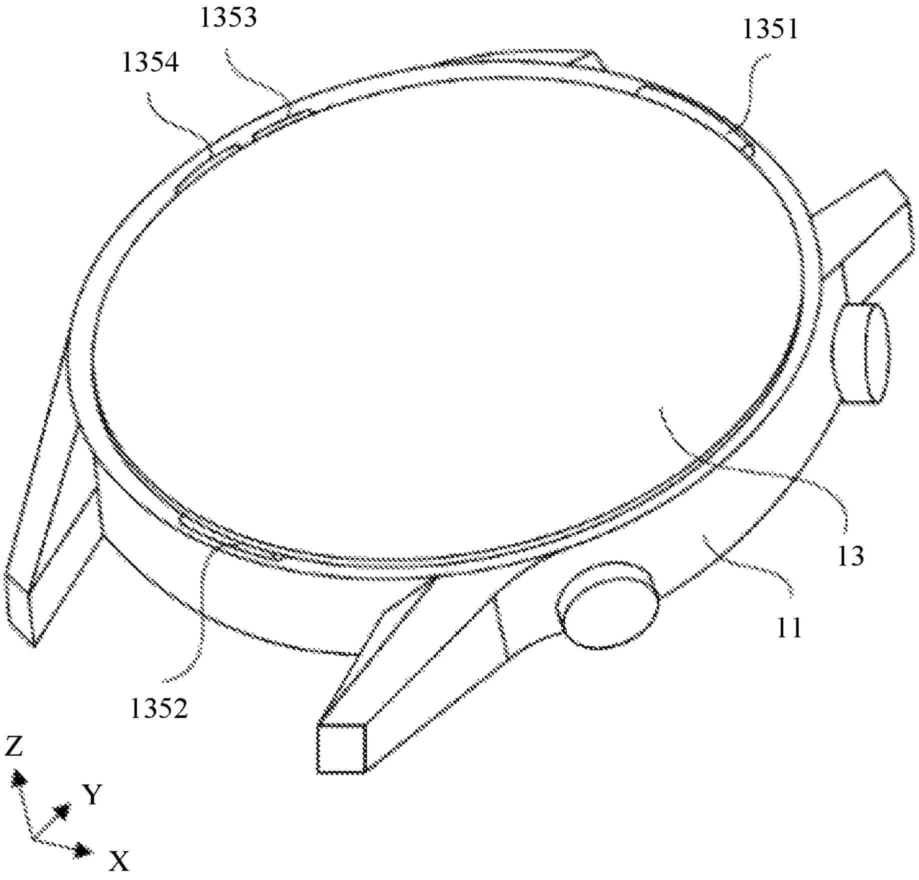
FIG. 3 is a schematic diagram of a structure of a screen component in a wearable device according to an embodiment of this application.
Figure 4:
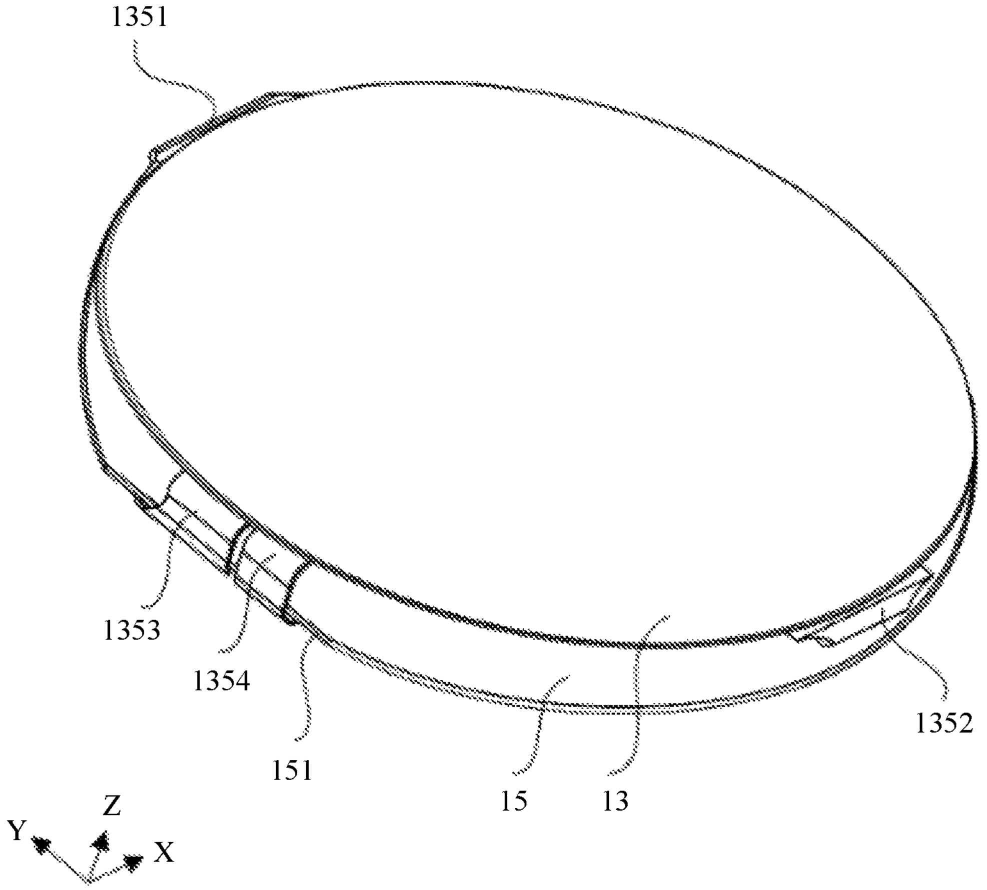
FIG. 4 is a schematic diagram of a structure of a connection between a screen component and a main circuit board according to an embodiment of this application.

FIG. 3 is a schematic diagram of a structure of a screen component in a wearable device according to an embodiment of this application. FIG. 4 is a schematic diagram of a structure of a connection between a screen component and a main circuit board according to an embodiment of this application. As shown in FIG. 3 and FIG. 4, the flexible printed circuit 135 includes a first outgoing line 1351 and a second outgoing line 1352. After extending out from an edge of the touch layer 132, the first outgoing line 1351 led out from the touch layer 132 bends toward a back direction of the screen component 13, extends to an edge of the screen component 13 from the back of the screen component 13, and bends in a direction of approaching a main circuit board 15, to obtain a first bend 1353 to connect to a wiring part 151 on the main circuit board 15 below the screen component 13. After extending out from an edge of the display panel 133, the second outgoing line 1352 led out from the display panel 133 bends toward the back direction of the screen component 13, extends to the edge of the screen component 13 from the back of the screen component 13, and bends in a direction of approaching the main circuit board 15, to obtain a second bend 1354 to connect to the wiring part 151 on the main circuit board 15 below the screen component 13. After being led out from the edge of the screen component 13, the first outgoing line 1351 and the second outgoing line 1352 bend toward the back direction of the screen component 13, thereby reducing a volume occupied by the flexible printed circuit 135.

When the touch layer 132 and the display panel 133 are separated, flat cables of the first outgoing line 1351 and the second outgoing line 1352 are relatively wide. For example, a width of a flat cable of the first outgoing line 1351 may be 5 mm to 7 mm, a width of a flat cable of the second outgoing line 1352 may be 6 mm to 8 mm, and lengths of parts that are of the first outgoing line 1351 and the second outgoing line 1352 and that protrude from the screen component 13 are 1.1 mm to 1.3 mm. The first outgoing line 1351 and the second outgoing line 1352 may be disposed away from each other, to minimize mutual interference and facilitate entire-system stacking. For example, the first outgoing line 1351 and the second outgoing line 1352 may be respectively disposed near a twelve-o'clock position and a six-o'clock position of the screen component 13. The first bend 1353 and the second bend 1354 may be disposed side by side, for example, disposed near a nine-o'clock position of the screen component 13, to reduce an arrangement difficulty of the flexible printed circuit 135.

In another possible implementation, for example, when the touch layer 132 and the display panel 133 are integrated, the first outgoing line 1351 and the second outgoing line 1352 may be disposed together, for example, disposed near the six-o'clock position of the screen component 13, so that an area occupied by the outgoing lines of the screen component 13 is smaller.

Figure 5:
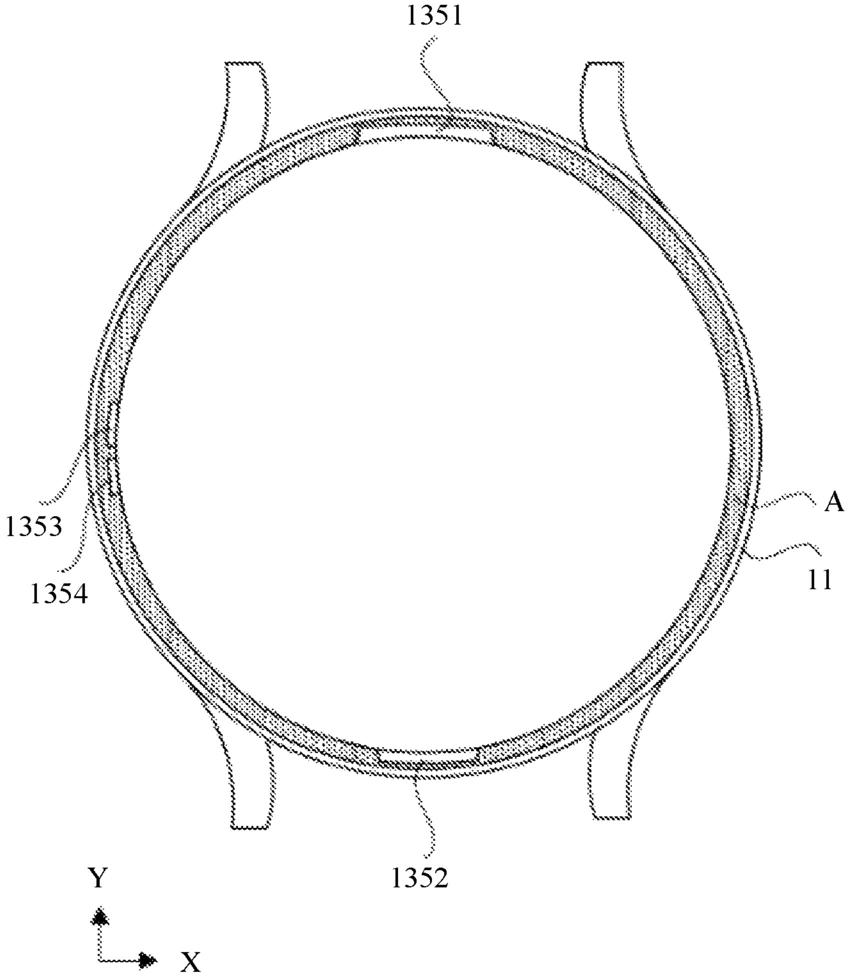
FIG. 5 is a top view of a screen component and a metal middle frame according to an embodiment of this application.

FIG. 5 is a top view of a screen component and a metal middle frame according to an embodiment of this application. With reference to FIG. 3 to FIG. 5, it is easy to learn that the first outgoing line 1351, the second outgoing line 1352, the first bend 1353, and the second bend 1354 are separately connected to an edge of a main body of the screen component 13 and extend out by a specific length. The screen component 13 is accommodated inside the metal middle frame 11, and accommodating space A (a filled part in the figure) between an end of the screen component 13 and an inner wall surface of the metal middle frame 11 exists to accommodate the first outgoing line 1351, the second outgoing line 1352, the first bend 1353, and the second bend 1354. It should be noted that the screen component 13 is presented in a nearly circular plate-like structure as a whole. "The end of the screen component 13" refers to a sidewall surface around the screen component 13.

The accommodating space A is presented in an annular shape as a whole. If no component is arranged in space other than space occupied by the first outgoing line 1351, the second outgoing line 1352, the first bend 1353, and the second bend 1354, overall space utilization of the wearable body 100 is not high enough, and internal component arrangement is not compact enough. The accommodating space A has a relatively small volume, and is relatively close to the end of the screen component 13, and therefore it is difficult to arrange electronic elements. However, considering that the accommodating space A is located around the screen component 13, and is away from the user arm and an electronic component such as a battery in the wearable body 100, in this embodiment of this application, an antenna may be disposed in the accommodating space A, and a volume required for the antenna is relatively small. In addition, a position of the accommodating space A can prevent, to a relatively great extent, the antenna from being affected by problems of human body interference and component interference.

The following specifically describes, with reference to the accompanying drawings, an implementation in which an antenna is disposed in the accommodating space A provided in this embodiment of this application.

Figure 6:
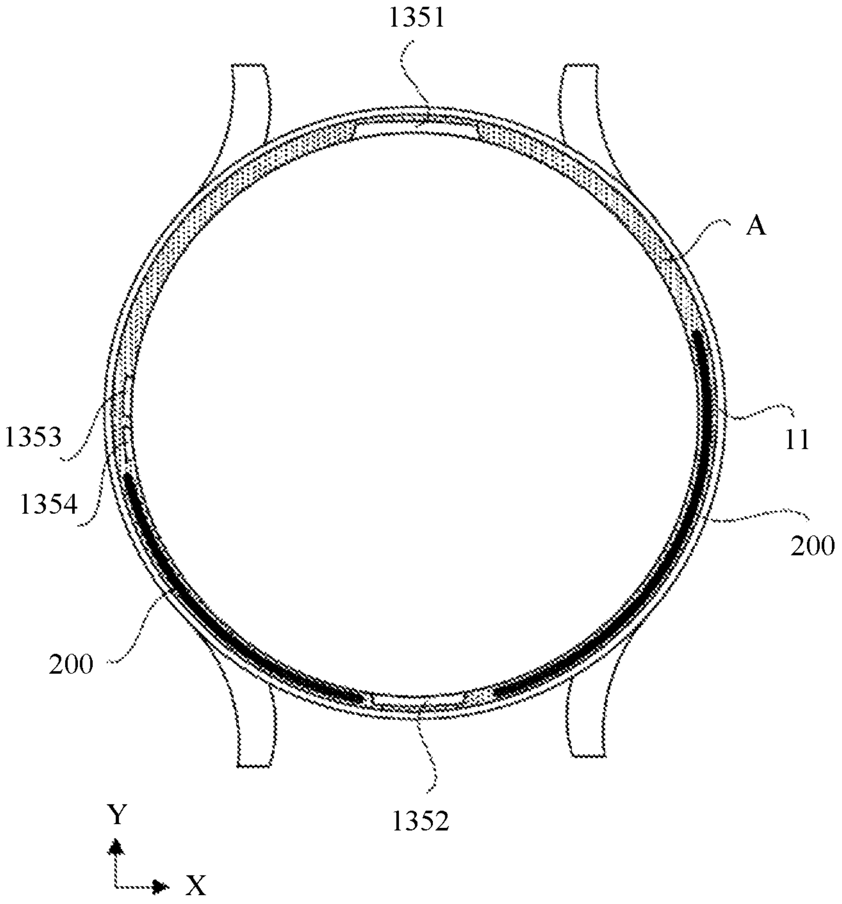
FIG. 6 is a schematic diagram of a structure of disposing an antenna in accommodating space according to an embodiment of this application.

FIG. 6 is a schematic diagram of a structure of disposing an antenna in accommodating space according to an embodiment of this application. As shown in FIG. 6, in this embodiment of this application, a first antenna 200 may be disposed in the accommodating space A, there is one or more first antennas 200, and the first antenna 200 occupies a partial volume of the accommodating space A, and does not interfere with the first outgoing line 1351, the second outgoing line 1352, the first bend 1353, and the second bend 1354. The first antenna 200 may be an electrical antenna whose electrical length is $\lambda/4$, and is used as a global navigation satellite system (GNSS) antenna (L1 band or L5 band), a Bluetooth (BT) antenna, a wireless fidelity (Wi-Fi) antenna, or the like.

The first antenna 200 may be implemented as follows: A separate antenna bracket is added, the antenna bracket is used as a carrier, and a metal cable is plated on the antenna bracket as an antenna; or a metal insert may be built in a support part, so that the metal insert is used as an antenna; or a flexible printed circuit is attached to a bracket as an antenna. The antenna bracket is an insulator, for example, may be plastic.

Figure 7:
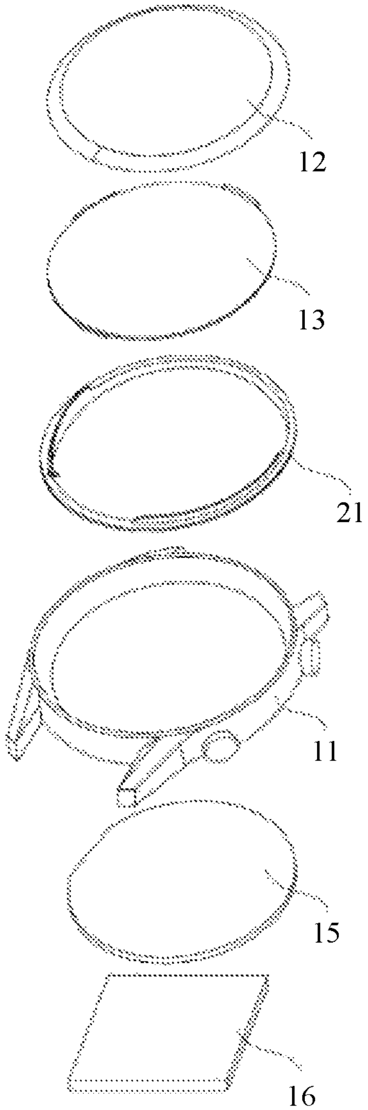
FIG. 7 is a schematic diagram of an explosion structure of some components in a wearable body of a wearable device according to an embodiment of this application.
Figure 8:
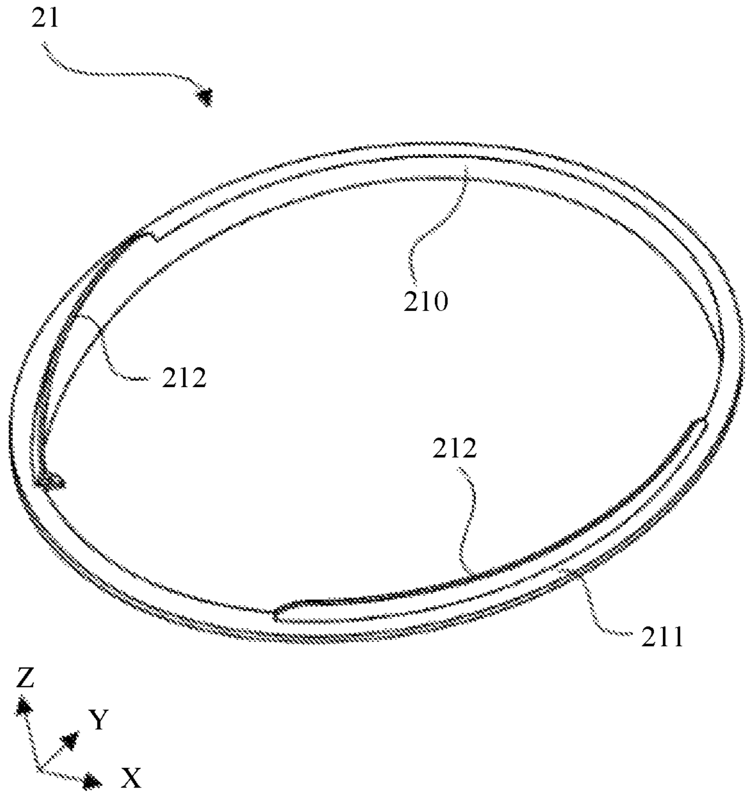
FIG. 8 is a schematic diagram of a structure of a bracket according to an embodiment of this application.
Figure 9:
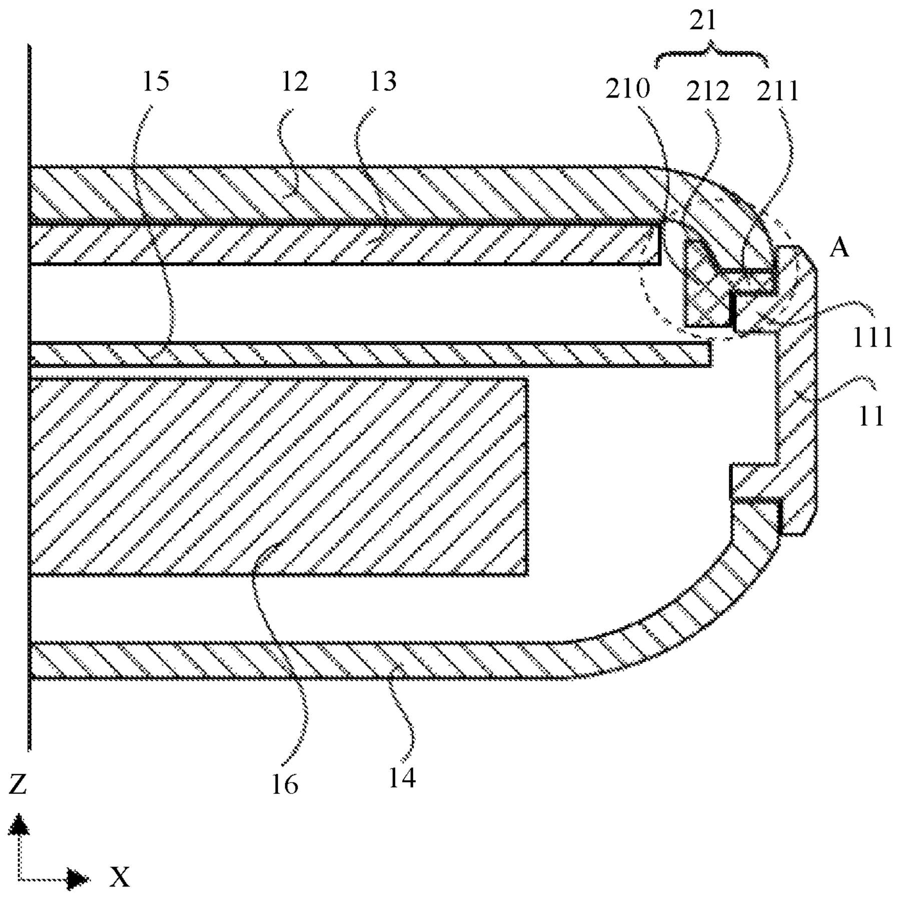
FIG. 9 is a schematic diagram of a structure of a cross section of a wearable device according to an embodiment of this application.

FIG. 7 is a schematic diagram of an explosion structure of some components in a wearable body of a wearable device according to an embodiment of this application. FIG. 8 is a schematic diagram of a structure of a bracket according to an embodiment of this application. FIG. 9 is a schematic diagram of a structure of a cross section of a wearable device according to an embodiment of this application. As shown in FIG. 7 to FIG. 9, the wearable body 100 of the wearable device provided in this embodiment of this application includes the cover 12, the screen component 13, the circuit board 15, a battery 16, and a bottom cover 14 that are disposed from top to bottom. An antenna bracket 21 is disposed in the accommodating space A formed between the end of the screen component 13, an inner wall of the metal middle frame 11, and an inner wall of the cover 12, and the first antenna 200 is disposed on the antenna bracket 21.

A size of the cover 12 is greater than that of the screen component 13, and an edge of the cover 12 is connected to the metal middle frame 11 through gluing, clamping, or the like. In this case, the accommodating space A (a part circled by a dashed line in the figure) is enclosed by an inner wall of an edge area of the cover 12, the inner wall of the metal middle frame 11, and the end of the screen component 13. In a possible implementation, the cover 12 may be disposed as 2.5D glass or 3D glass, so that the wearable body 100 has a more beautiful aesthetic appearance, and the user feels smoother during touching. The edge area of the cover 12 bends downward, and the accommodating space A (the part circled by the dashed line in the figure) is enclosed by an inner wall of the bent area of the cover 12, the inner wall of the metal middle frame 11, and the end of the screen component 13.

The antenna bracket 21 may include a bracket body 210, and the bracket body 210 is a main structural part of the antenna bracket 21, to ensure structural strength of the antenna bracket 21. The bracket body 210 is accommodated in the accommodating space A, and the bracket body 210 may be annular, and occupies all of a length of the annular accommodating space A; or the bracket body 210 may be arc-shaped, and occupies only a part of a length of the accommodating space A. When the bracket body 210 is annular, an entire structure of the antenna bracket 21 is more stable, and it is easy to assemble and disassemble the antenna bracket 21.

The antenna bracket 21 is disposed in the accommodating space A. A specific fastening manner of the antenna bracket 21 is not specifically limited in this embodiment. The antenna bracket 21 may be connected to the metal middle frame 11 through gluing, clamping, screwing, or the like, or may be connected to the inner wall of the cover 12 through gluing or the like, or is fastened to both the antenna bracket 21 and the metal middle frame 11. In a possible implementation, a limiting step 111 is disposed on the inner wall of the metal middle frame 11 through protrusion, an extension part 211 is provided on the antenna bracket 21, and the extension part 211 is formed by extending the bracket body 21 in a direction of approaching the metal middle frame 11. The extension part 211 may be sandwiched between the cover 12 and the limiting step 111, and is connected to the cover 12 and the limiting step 111 by using adhesives to seal slots between the cover 12, the antenna bracket 21, and the metal middle frame 11 while fastening the antenna bracket 21, to prevent liquid from entering the inside of the wearable body 100, thereby meeting a waterproof requirement of the wearable device. When the cover 12 is 2.5D glass or 3D glass, the edge area of the cover 12 bends downward, and the extension part 211 may be sandwiched between an end face of the cover 12 and the limiting step 11.

In a possible implementation, the first antenna 200 may be implemented as follows: On the antenna bracket 21 made of a molding plastic material, a computer controls, based on a track of a conductive pattern, laser to move, to directly obtain a metal antenna on the antenna bracket 21 by using the laser, namely, a laser direct structuring (laser direct structuring, LDS) technology.

A cabling part 212 is further disposed on the antenna bracket 21, and the cabling part 212 is configured to cover the metal cable to obtain the first antenna 200. A size, a shape, and a position of the cabling part 212 may affect performance of the first antenna 200. In a possible implementation, the cabling part 212 may be a part of the bracket body 210, in other words, an area that has a specific length and width at a specific position of the bracket body 210 may be used as the cabling part 212. In another possible implementation, as shown in FIG. 8, a bar protrusion disposed on the bracket body 210 through protrusion may alternatively constitute the cabling part 212. The bar protrusion is adapted to a shape of an inner wall surface of the cover 12, and a size, a position, and a shape of the bar protrusion match the to-be-molded first antenna 200, so that a difficulty in a molding process of the metal cable is reduced.

Figure 10:
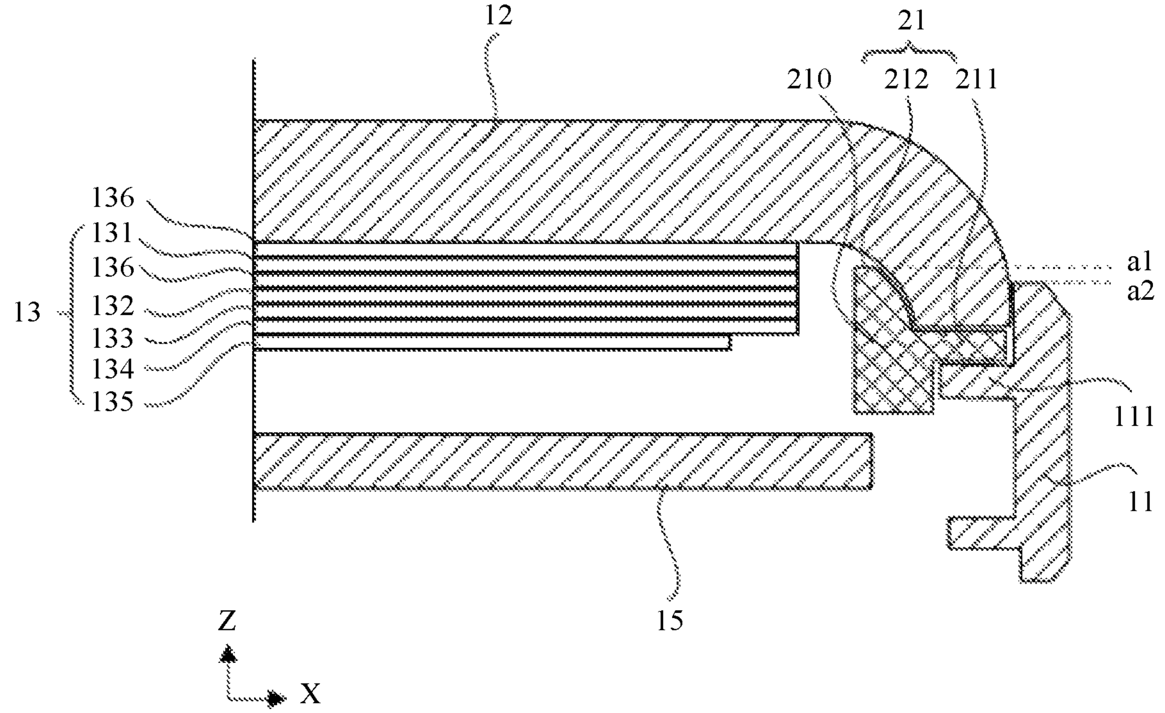
FIG. 10 is a schematic diagram of a structure of another cross section of a wearable device according to an embodiment of this application.

FIG. 10 is a schematic diagram of a structure of another cross section of a wearable device according to an embodiment of this application. As shown in FIG. 10, in this embodiment of this application, the cabling part 212 may be flush with or higher than an upper edge of the metal middle frame 11, where a2 indicates "flush" and a1 indicates "higher", so that impact on the metal antenna on the cabling part 212 that is caused by the metal middle frame 11 can be reduced.

In a possible implementation, the cabling part 212 may be located on a side of the antenna bracket 21 that is away from the circuit board 15. The touch layer 132, the display panel 133, and the flexible printed circuit 135 in the screen component 13 and the circuit board 15 include metals, and therefore may affect performance of the first antenna 200. Therefore, the cabling part 212 is disposed as far away from the circuit board 15 as possible and as close to the cover 12 as possible, so that impact on the first antenna 200 that is caused by metal components such as the screen component 13 and the circuit board 15 inside the wearable body 100 can be minimized. In addition, when the wearable body 100 is worn on the user arm, the first antenna 200 is away from the arm, and is little subject to human body absorption, and degradation of antenna performance that is caused by a human body is small.

Figure 11:
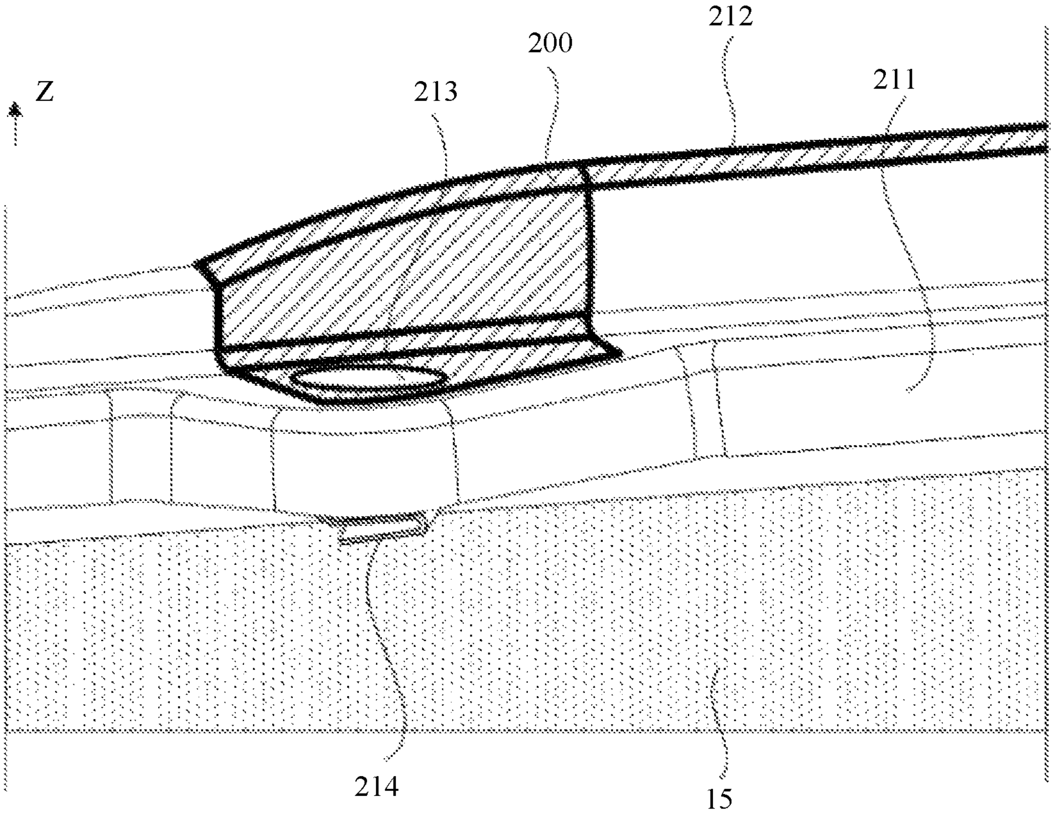
FIG. 11 is a schematic diagram of a structure of a connection between a first antenna and a circuit board of a wearable device according to an embodiment of this application.

The first antenna 200 is electrically connected to the circuit board 15 to implement feeding. FIG. 11 is a schematic diagram of a structure of a connection between a first antenna and a circuit board of a wearable device according to an embodiment of this application. As shown in FIG. 11, the first antenna 200 is a metal cable that covers the cabling part 212 of the antenna bracket 21 (a shadow filled in the cabling part 212 in the figure indicates the metal cable), and is electrically connected to the circuit board 15 by using a conductive via 213 disposed on the antenna bracket 21 and a spring plate 214. It may be understood that the first antenna 200 may be alternatively fed by using an electric-conductor such as a screw or a steel sheet.

In addition, avoidance structures (not shown in the figure) are further disposed on the antenna bracket 21, for example, at a six-o'clock position, a nine-o'clock position, and a twelve-o'clock position, and the avoidance structures are disposed to avoid the outgoing lines, of the flexible printed circuit 135, on the edge of the screen component 13. A structure (not shown in the figure) such as a stiffener may be further disposed on the antenna bracket 21, to enhance strength of the antenna bracket 21, and effectively prevent performance of the first antenna 200 from being affected because the antenna bracket 21 is stressed and deformed.

The following describes a specific structure of the first antenna 200 provided in this embodiment of this application with reference to specific embodiments and accompanying drawings.

Figure 12:
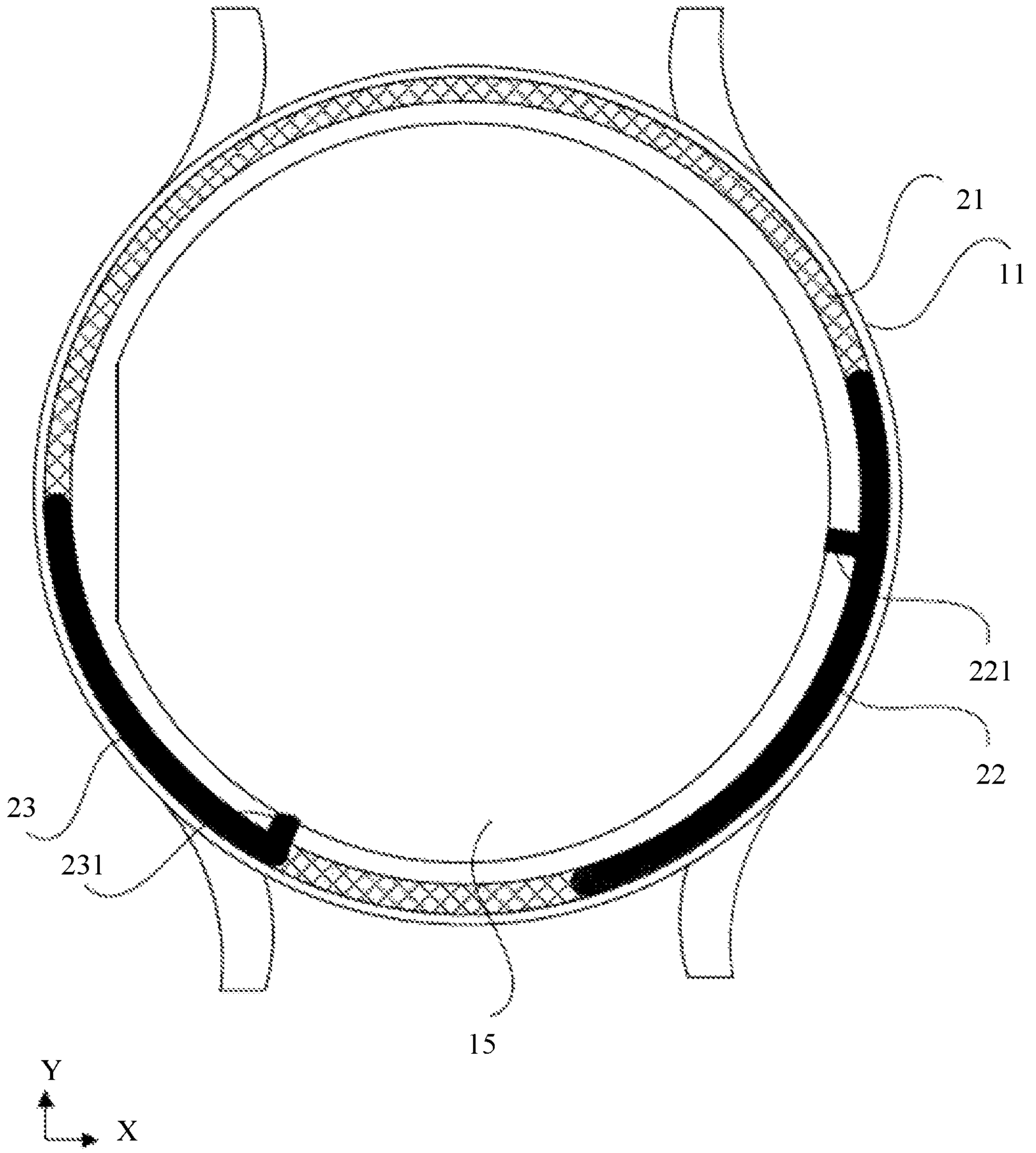
FIG. 12 is a schematic diagram of a structure of a first antenna according to an embodiment of this application.

FIG. 12 is a schematic diagram of a structure of a first antenna according to an embodiment of this application. As shown in FIG. 12, the first antenna 200 may include a first radiator 22 and a second radiator 23. The first radiator 22 and the second radiator 23 are disposed in the accommodating space A at intervals, and may be respectively used as a GNSS L5 antenna and a BT/Wi-Fi antenna.

Electrical lengths of the first radiator 22 and the second radiator 23 are determined based on an operating frequency of the antenna, and may be respectively ¼ of wavelengths corresponding to operating frequencies of the GNSS L5 antenna and the BT/Wi-Fi antenna. It should be noted that the lengths of the first radiator 22 and the second radiator 23 may be less than ¼ of corresponding wavelengths due to impact of a material of the antenna bracket 21 and loading of a peripheral component of the first antenna 200. Minimum values may be used as widths of the first radiator 22 and the second radiator 23 if possible while processing molding and consistency are ensured, to increase distances between the first antenna 200 and the metal middle frame 11 and between the first antenna 200 and the screen component 13, and reduce impact on performance of the first antenna 200 that is caused by the metal middle frame 11 and the screen component 13. In a possible implementation, a width of the first antenna 200 may be 0.6 mm to 0.8 mm.

In this embodiment of this application, the first radiator 22 is connected to the main circuit board 15 by using a first feedpoint 221, and the second radiator 23 is connected to the main circuit board 15 by using a second feedpoint 231. No ground point may be disposed for the first antenna 200, and the first antenna 200 is used as a monopole antenna. In another possible implementation, both the first radiator 22 and the second radiator 23 each may have a ground point, and a distance between the ground point and a corresponding feedpoint may be 1.8 mm to 2.2 mm, to obtain an IFA antenna.

For example, the first feedpoint 221 is located at a half-past-three position of the wearable body 100, and a cable of the first radiator 22 is arranged counterclockwise from a half-past-five position to a half-past-two position of the wearable body 100. The second feedpoint 231 is located at a seven-o'clock position of the wearable body 100, and a cable of the second radiator 23 is arranged clockwise from the seven-o'clock position to a nine-o'clock position of the wearable body 100. After the first radiator 22 is fed by using the first feedpoint 221, a length from the first feedpoint 221 to the half-past-two position may play a tuning role.

Figure 13:
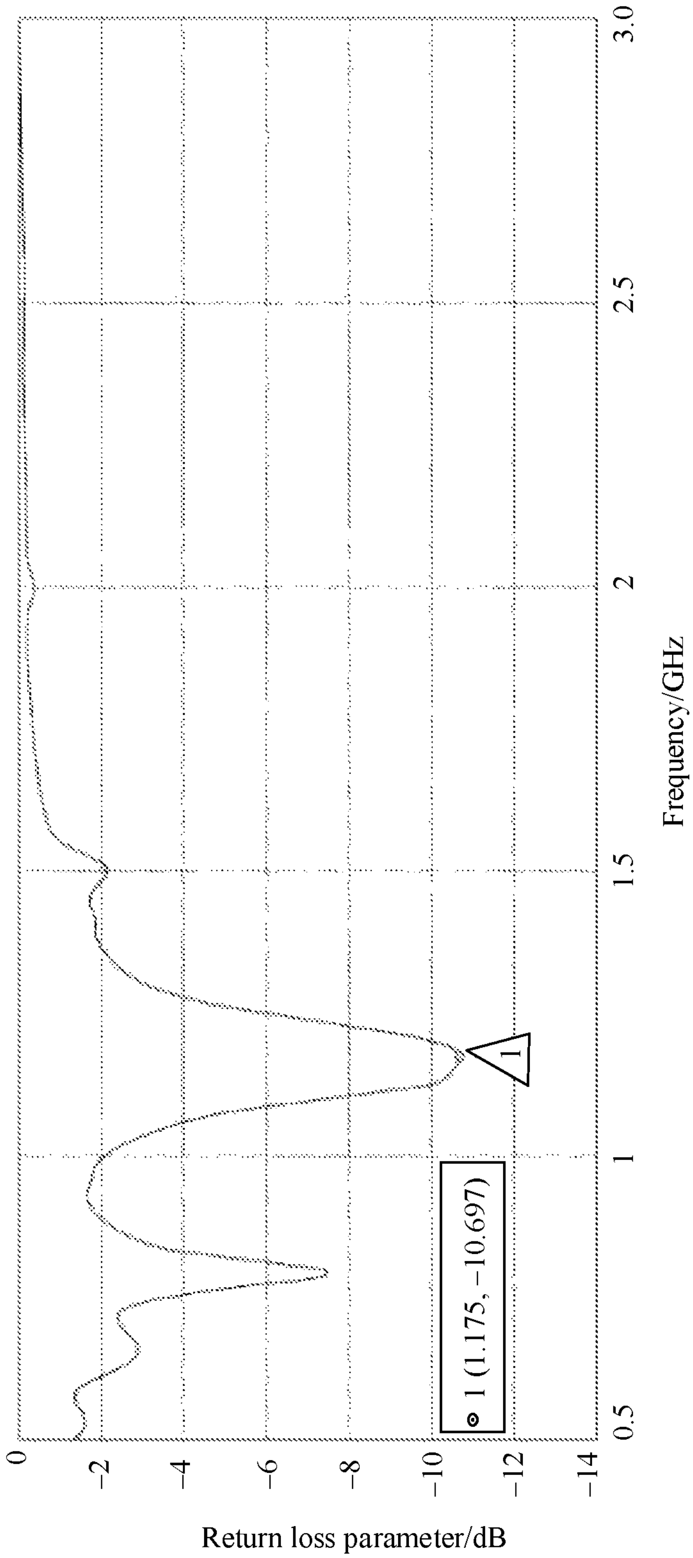
FIG. 13 is a diagram of S11 of a first radiator according to an embodiment of this application.
Figure 14:
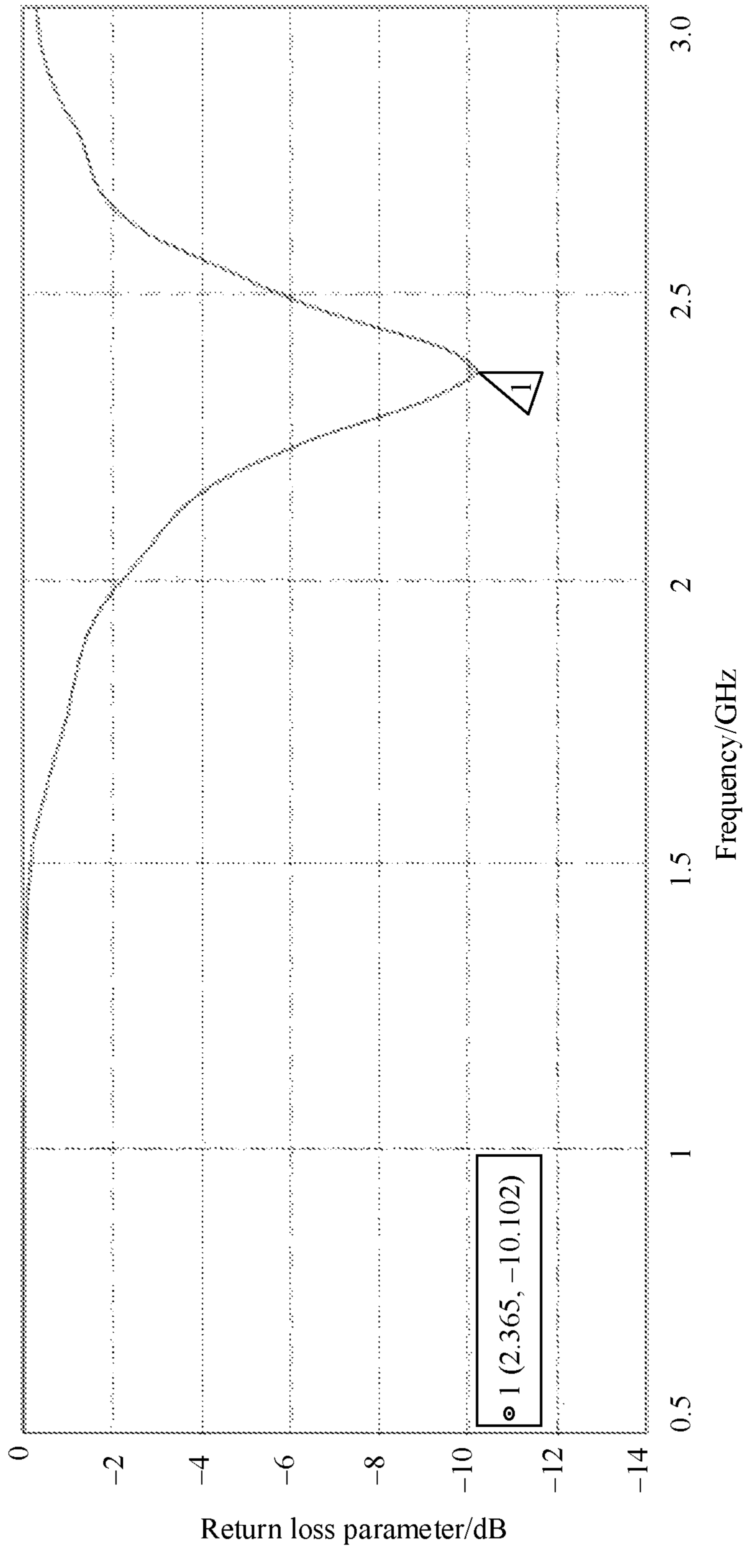
FIG. 14 is a diagram of S11 of a second radiator according to an embodiment of this application.

FIG. 13 is a diagram of S11 of a first radiator according to an embodiment of this application. FIG. 14 is a diagram of S11 of a second radiator according to an embodiment of this application. In FIG. 13 and FIG. 14, a horizontal coordinate represents a frequency in a unit of GHz, and a vertical coordinate represents a return loss parameter in a unit of dB. Curves in FIG. 13 and FIG. 14 respectively represent return losses of the first radiator 22 and the second radiator 23 on each band. As shown in FIG. 13 and FIG. 14, the first radiator 22 has good resonance on a GNSS L5 band (1176 MHz), and the second radiator 23 has good resonance on a BT/Wi-Fi band (2400-2500 MHz).

According to the wearable device provided in this embodiment of this application, the antenna is disposed in the accommodating space between the screen component and the metal middle frame, so that space inside the wearable device can be properly used, and a multi-antenna design in the wearable device can be implemented. In addition, the first antenna disposed in the accommodating space is away from a user arm and a component in the wearable body, so that impact on antenna performance that is caused by human body absorption and a metal component can be reduced.

With extension of functions of a wearable device, the wearable device needs to meet more communications standards. If only one antenna is disposed in the wearable device, problems of difficult antenna disassembling, antenna bandwidth, an insertion loss of a radio frequency antenna channel component, and the like occur. To resolve the problems, in the embodiments of this application, in addition to the foregoing manner of disposing the first antenna 200 in the accommodating space between the screen component 13 and the metal middle frame 11, a slot between the main circuit board 15 and the metal middle frame 11 may be fed and excited by using the metal middle frame 11, to implement a slot antenna.

The following describes the slot antenna provided in the embodiments of this application with reference to specific accompanying drawings.

Figure 15:
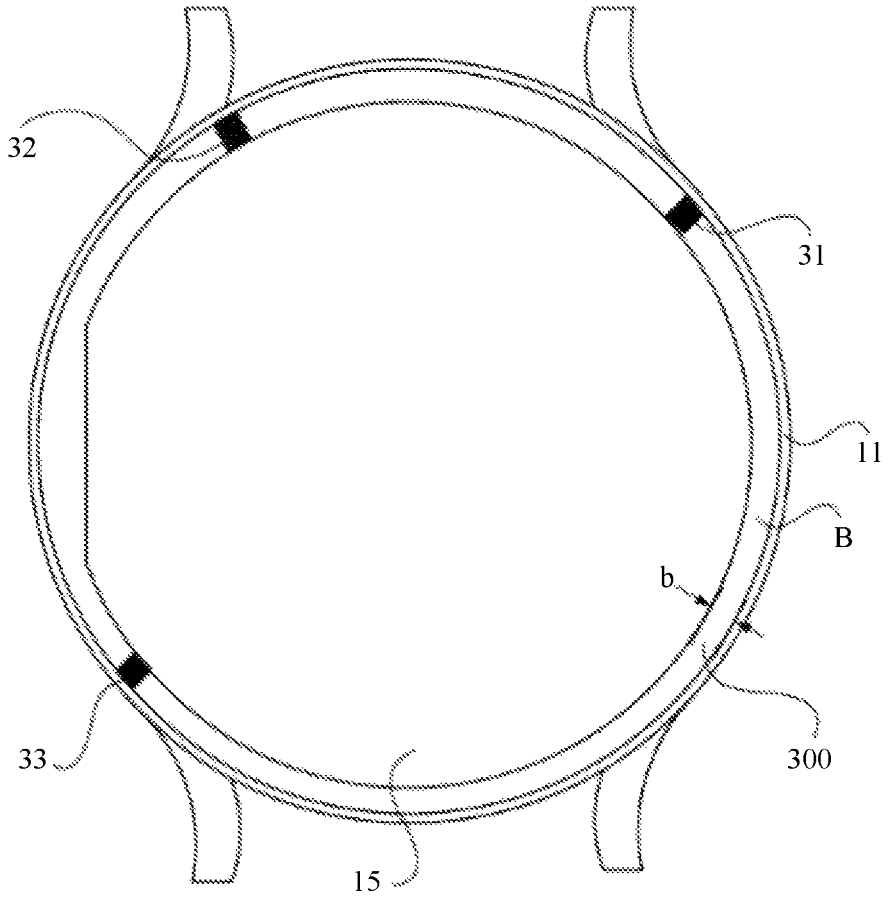
FIG. 15 is a schematic diagram of a structure of a second antenna according to an embodiment of this application.

FIG. 15 is a schematic diagram of a structure of a second antenna according to an embodiment of this application. As shown in FIG. 15, there is a slot B between the main circuit board 15 and the metal middle frame 11, the main circuit board 15 and the metal middle frame 11 may be connected by using a third feedpoint 31 to implement feeding, the main circuit board 15 is grounded by using the first ground point 32 and the second ground point 33, and the slot B is excited after being fed, so that the slot antenna can be implemented.

A width b of the slot B between the metal middle frame 11 and the main circuit board 15 is specifically determined by using sizes of the metal middle frame 11 and the main circuit board 15. It may be understood that the width of the slot is far less than a wavelength corresponding to a resonance frequency of the slot antenna, and may be any width of the slot antenna. This is not limited herein. For example, the width of the slot may be 0.5 mm to 1.8 mm.

In a possible implementation, the third feedpoint 31 may be disposed at a two-o'clock position of the wearable body 100, the first ground point 32 may be disposed at an eleven-o'clock position of the wearable body 100, and the second ground point 33 may be disposed at an eight-o'clock position of the wearable body 100. By using a slot antenna theory, resonance of λ/2, λ, 3λ/2, and 2λ may be generated, covering LB (698-960 MHz), MB (1710-2170 MHz), and HB (2300-2690 MHz), and slot antennas corresponding to the resonance may be used as cell (cell) antennas (790-960 MHz and 1710-2690 MHz) and a GNSS L1 (1575 MHz) antenna.

Figure 16:
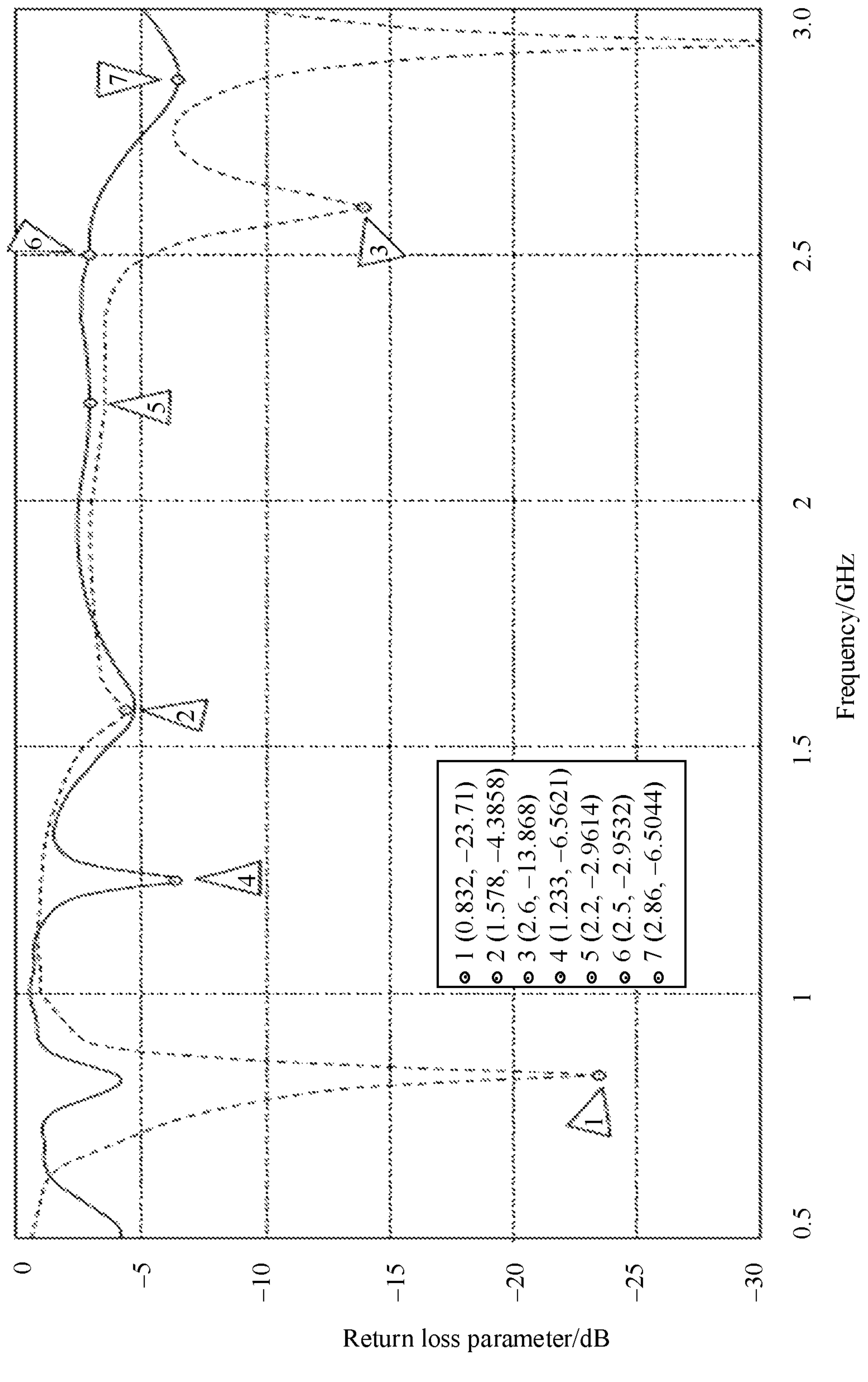
FIG. 16 is a diagram of S11 of a second antenna according to an embodiment of this application.

FIG. 16 is a diagram of S11 of a second antenna according to an embodiment of this application. A dashed line in FIG. 16 indicates a diagram of S11 of the second ground point 33 in a short-circuit state, 1, 2, and 3 are resonance frequencies in this state, a solid line indicates a diagram of S11 of the second ground point 33 in an open-circuit state, and 4, 5, 6, and 7 are resonance frequencies in this state. As shown in FIG. 16, it is easy to learn that modes of λ/2, λ, 3λ/2, and 2λ may be excited in both the short-circuit state and the open-circuit state of the second ground point 33, and resonance frequencies of the second ground point 22 are offset in both the short-circuit state and the open-circuit state of the second ground point 22. Therefore, frequency tuning may be performed by loading different inductors or capacitors at the second ground point 33.

Figure 17:
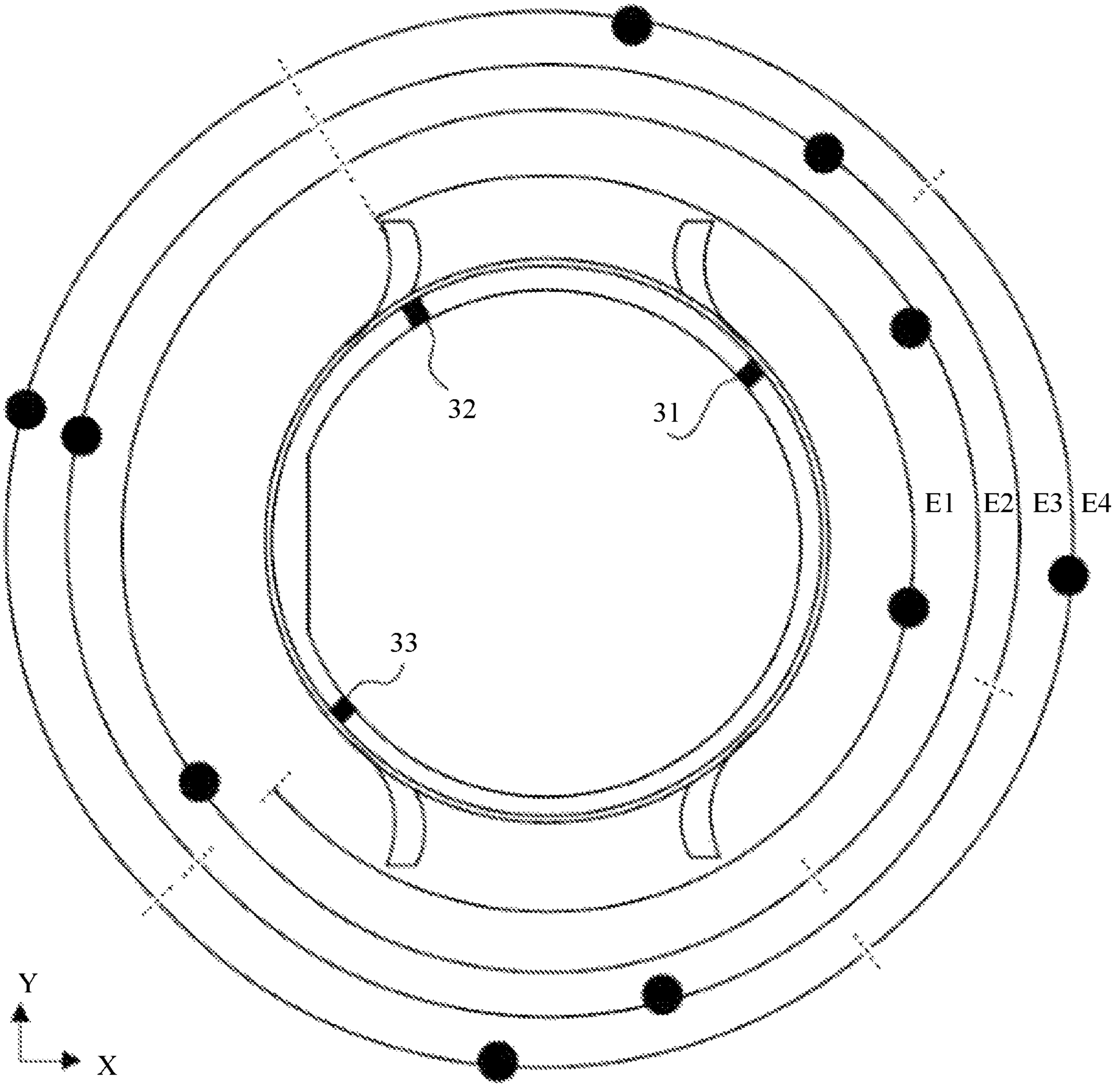
FIG. 17 is a schematic diagram of electric field distribution of a second antenna according to an embodiment of this application.

FIG. 17 is a schematic diagram of electric field distribution of a second antenna according to an embodiment of this application. In FIG. 17, four lines E1, E2, E3, and E4 are drawn from inside to outside. A black dot indicates that an electric field has a peak value at the location, and a dashed line indicates that the electric field has a valley value at the location. As shown in FIG. 17, when feeding is performed by using the third feedpoint 31, and grounding is performed by using the first ground point 32 and the second ground point 33, four modes E1, E2, E3, and E4 of the antenna may be excited. E1 has an electric field peak value, corresponding to the λ/2 mode of the antenna; E2 has two electric field peak values, corresponding to the λ mode of the antenna; E3 has three electric field peak values, corresponding to the 3λ/2 mode of the antenna; and E4 has four electric field peak values, corresponding to the 2λ mode of the antenna.

For a second antenna 300, when a resonance frequency is low due to adjustment of outline dimensions or environment loading of a peripheral component such as a screen, positions of the first ground point 32 and the second ground point 33 on the second antenna 300 may be adjusted to adjust a size of the slot antenna. Alternatively, an inductor, a capacitor, a filter circuit, or an antenna switch may be used for grounding to load/unload a resonant strong electric field area or strong current area, so that a resonance frequency ratio can be adjusted to extend a coverage band of the second antenna 300.

Figure 18:
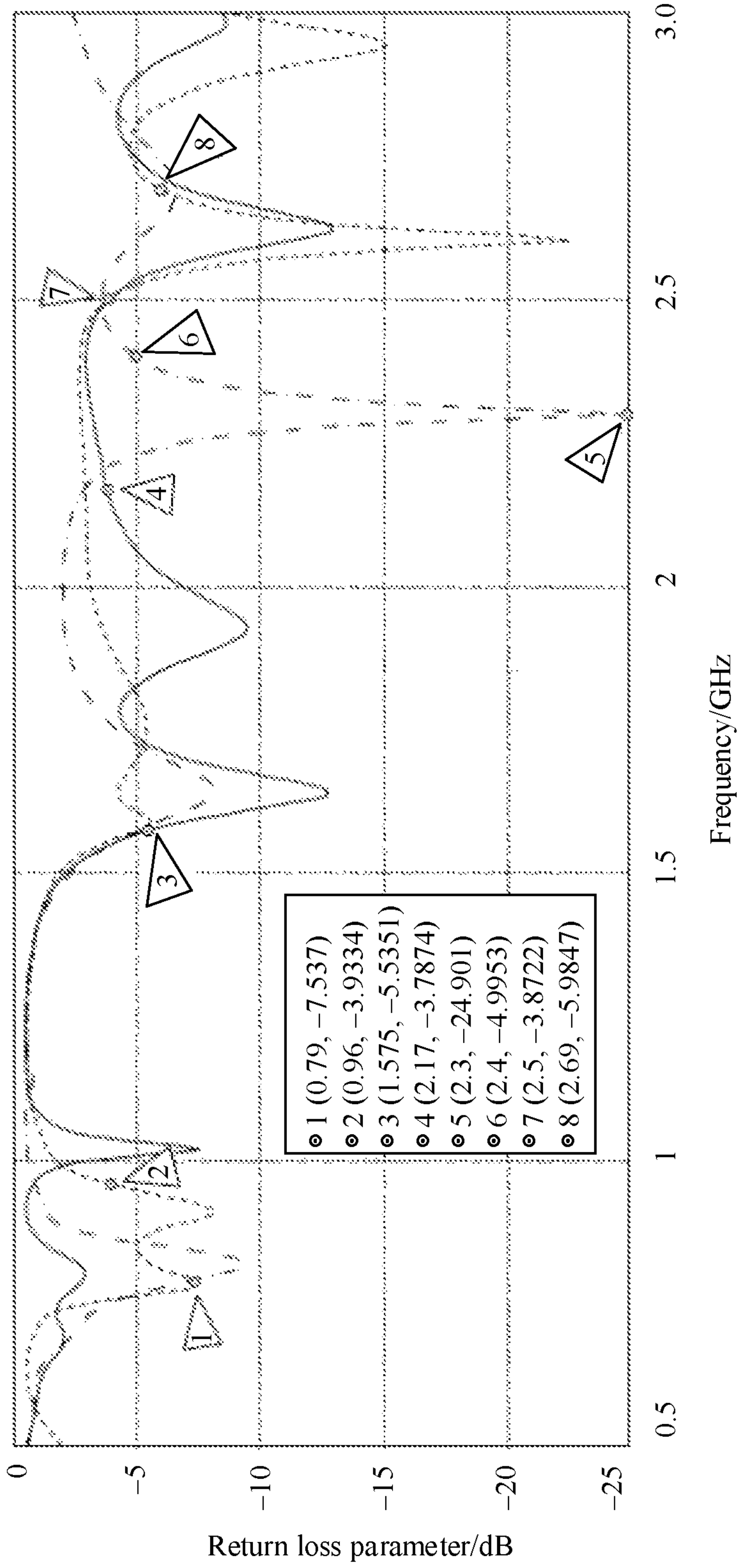
FIG. 18 is a diagram of S11 corresponding to a second antenna when a switch is switched to different states according to an embodiment of this application.

FIG. 18 is a diagram of S11 corresponding to a second antenna when a switch is switched to different states according to an embodiment of this application. The diagram of S11 provided in FIG. 18 shows that, at the second ground point 33 of the second antenna 300, that is, at the eight-o'clock position of the wearable body 100, the antenna switch is connected to perform adjustment to obtain different capacitances of a capacitor, so that return loss curves in different states are obtained. In FIG. 18, a dash-dot line indicates a corresponding S11 diagram when a capacitance of the capacitor connected at the second ground point 33 is 1.5 pF, and 5 and 6 are resonance frequencies in this state. A solid line indicates a corresponding S11 diagram when a capacitance of the capacitor connected at the second ground point 33 is 4.7 pF, and 3 and 4 are resonance frequencies in this state. A dashed line indicates a corresponding S11 diagram when a capacitance of the capacitor connected at the second ground point 33 is 39 pF, and 1, 2, 7, and 8 are resonance frequencies in this state. As shown in FIG. 18, by loading different capacitances at the second grounding point 33, full band coverage of 0.79-0.96 GHz and 1.575-2.69 GHz can be implemented.

Figure 19:
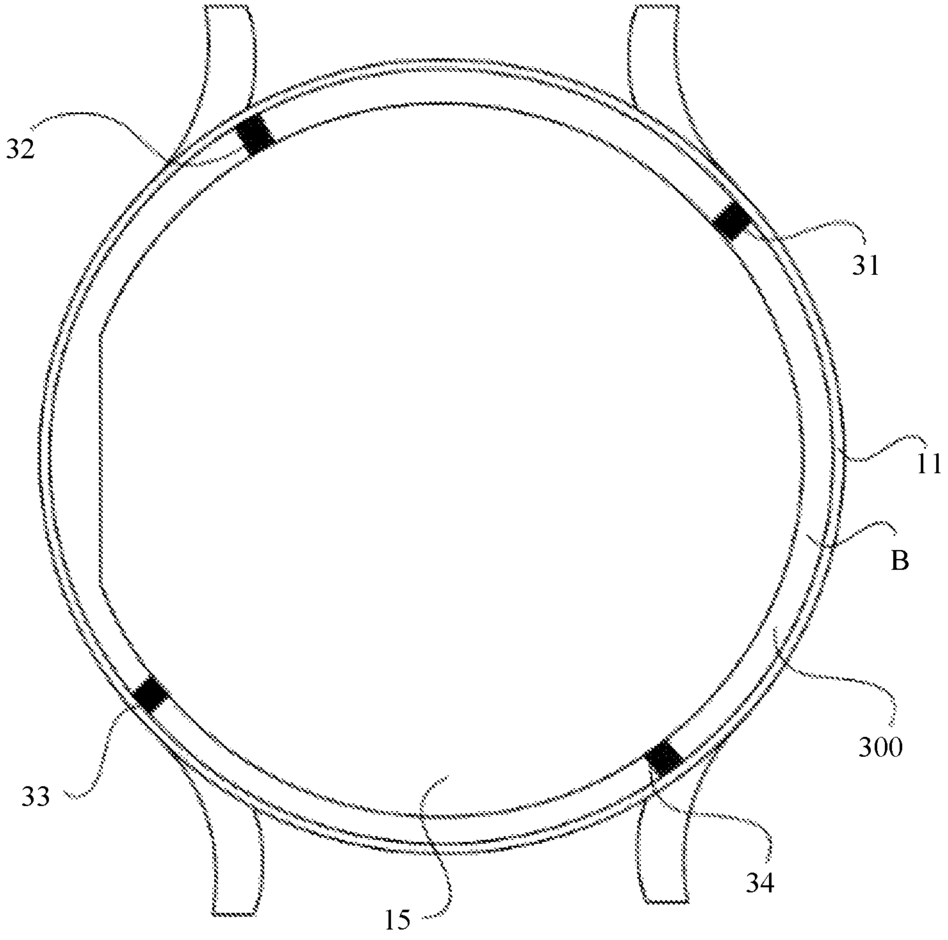
FIG. 19 is a schematic diagram of another structure of a second antenna according to an embodiment of this application.

FIG. 19 is a schematic diagram of another structure of a second antenna according to an embodiment of this application. As shown in FIG. 19, in another possible implementation, a third ground point 34 may be further disposed on the second antenna 300. For example, the third ground point 34 may be located near a five-o'clock position of the wearable body 100, and an inductor with a relatively large inductance (for example, an inductance higher than 15 nH) may be added at the third ground point 34, to perform frequency tuning on a low band of the second antenna 300. Alternatively, a capacitor or a filter circuit may be disposed at the third ground point 34.

The second antenna 300 may be fed and grounded by using a screw, an antenna spring plate, a steel sheet, or the like. It may be understood that the main circuit board 15 may be fastened to the metal middle frame 11 by using a fastener such as a screw, to ensure reliability of fastening the main circuit board 15 inside the wearable body 100. In addition, the second antenna 300 may be fed and grounded by using the screw, so that a quantity of parts is reduced, thereby improving overall space utilization of the wearable device.

In comparison with a technology in the conventional technology in which a slot is disposed on the metal middle frame 11 or the metal bottom cover to obtain an antenna, in this embodiment of this application, the slot antenna is designed by using the slot between the main circuit board 15 and the metal middle frame 11 without disposing slots on the metal middle frame 11 and the bottom cover, so that an aesthetic appearance of the wearable body 100 is improved and better visual experience is provided to the user. In addition, this facilitates processing and assembling of the housing of the wearable body 100 and a waterproof design of the entire system.

Figure 20:
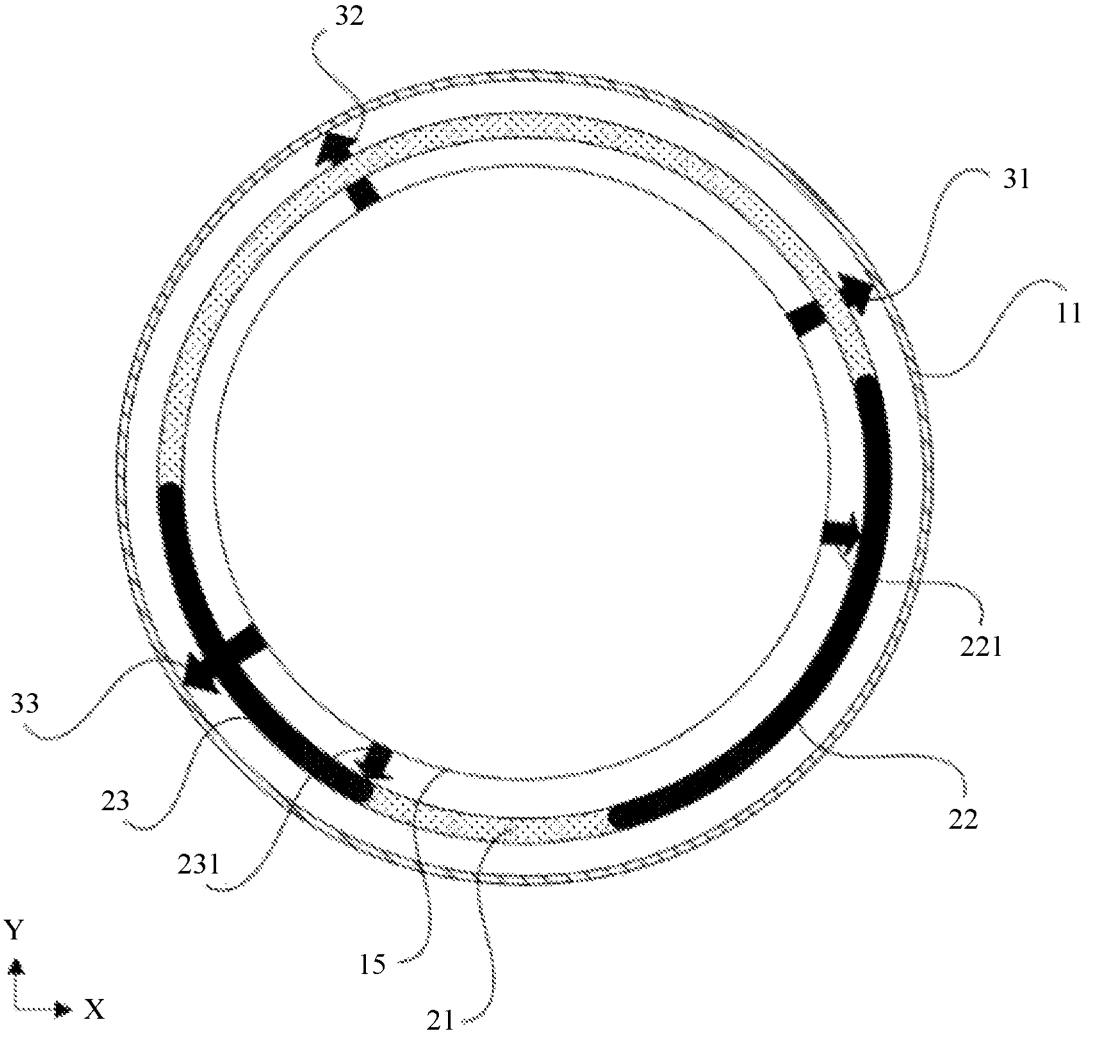
FIG. 20 is a schematic diagram of a structure of coexistence of a first antenna and a second antenna according to an embodiment of this application.

FIG. 20 is a schematic diagram of a structure of coexistence of a first antenna and a second antenna according to an embodiment of this application. As shown in FIG. 20, the first antenna 200 includes the first radiator 22 and the second radiator 23 that are formed on the antenna bracket 21. The cable of the first radiator 22 is arranged counterclockwise from the half-past-five position to the half-past-two position of the wearable body 100, and the first feedpoint 221 connected to the first radiator 22 and the main circuit board 15 is located at the half-past-three position of the wearable body 100. The cable of the second radiator 23 is arranged clockwise from the seven-o'clock position to the nine-o'clock position of the wearable body 100, and the second feedpoint 231 connected to the second radiator 23 and the main circuit board 15 is located at the seven-o'clock position of the wearable body 100. The second antenna 300 is a slot antenna formed between the main circuit board 15 and the metal middle frame 11. The third feedpoint 31 connected to the main circuit board 15 and the metal middle frame 11 may be disposed at the two-o'clock position of the wearable body 100. The first ground point 32 connected to the main circuit board 15 and the metal middle frame 11 may be disposed at the eleven-o'clock position of the wearable body 100. The second ground point 33 connected to the main circuit board 15 and the metal middle frame 11 may be disposed at the eight-o'clock position of the wearable body 100.

The first antenna 200 disposed on the antenna bracket 21 is affected by a peripheral component, and has a relatively short length, and therefore is suitable to be designed as a high-band antenna, in this embodiment of this application, two first antennas 200 are respectively designed as a GNSS L5 antenna and a BT/Wi-Fi antenna. The second antenna 300 is a slot antenna. A slot in the wearable body 100 is continuous and has a relatively long length, and the slot antenna is not susceptible to interference from the metal middle frame 11, and therefore is suitable to be designed as a low-band antenna. The second antenna 300 designed in this embodiment of this application is used as a cell antenna (790-960 MHz or 1710-2690 MHz) and a GNSS L1 (1575 MHz) antenna.

In addition, it can be learned from FIG. 1 that the keys are disposed at the two-o'clock position and the four-o'clock position of the wearable body 100. As shown in FIG. 3 to FIG. 6, the first outgoing line 1351 and the second outgoing line 1352 are disposed at a six-o'clock position and a twelve-o'clock position of the wearable body 100, and the first bend 1353 and the second bend 1354 are disposed at the nine-o'clock position of the wearable body 100. At these positions, an internal layout of the wearable body 100 is compact, and there may be a metal component that affects a feedpoint and a ground point. The first feedpoint 221, the second feedpoint 231, the third feedpoint 31, the first ground point 32, and the second ground point 33 may be disposed at positions that are close to the six-o'clock position and the twelve-o'clock position and that avoid the foregoing positions at which the layout is compact, to be as close to an outer edge of the arm as possible, thereby reducing impact on antenna radiation performance that is caused by the arm.

In addition, the first feedpoint 221 and the second feedpoint 231 of the first antenna 200 are spaced apart from the third feedpoint 31, the first ground point 32, and the second ground point 33 of the second antenna 300 by a specific distance, so that mutual impact between the first antenna 200 and the second antenna 300 can be avoided.

In this embodiment of this application, the coexistence design of the first antenna 200 and the second antenna 300 can resolve problems of antenna bandwidth implementation and communications standard-based division, and can better reduce a radio frequency channel insertion loss and improve antenna performance.

In addition, in the conventional technology, when two antennas are disposed in a wearable body of a wearable device, at least one antenna is disposed inside the wearable body, is surrounded by a metal housing, and is covered by components such as a circuit board, a motor, and a battery, causing a poor antenna clearance environment. In addition, when the wearable body is worn, the antenna is close to an arm, and human body absorption is great. Consequently, antenna performance is severely affected. In the embodiments of this application, the first antenna is disposed in the accommodating space between the screen component and the metal middle frame, and the second antenna is formed by using the slot between the main circuit board and the metal middle frame, so that impact on antenna performance that is caused by the metal housing of the wearable body, an internal electronic component, and a human body absorption factor can be effectively reduced.

In the embodiments of this application, it should be noted that, unless otherwise specified and limited, the terms “install”, “connect”, and “connected” should be understood in a broad sense, for example, may be a fixed connection, or may be an indirect connection through an intermediate medium, or may be an interconnection between two elements or an interaction relationship between two elements. Persons of ordinary skill in the art may understand specific meanings of the terms in the embodiments of this application based on specific cases. In the specification, claims, and accompanying drawings of the embodiments of this application, terms such as “first”, “second”, and “third” are intended to distinguish between similar objects but do not necessarily indicate a specific order or sequence.

Moreover, the terms “include”, “contain” and any other variants mean to cover the non-exclusive inclusion, for example, a process, method, system, product, or device that includes a list of steps or units is not necessarily limited to those steps or units, but may include other steps or units not clearly listed or inherent to such a process, method, system, product, or device.

Finally, it should be noted that the foregoing embodiments are merely intended for describing the technical solutions of the embodiments of this application rather than limiting this application. Although the embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A wearable device, comprising a wearable body, wherein the wearable body comprises a cover, a screen component, an antenna bracket, a first antenna, a metal middle frame, a circuit board, and a bottom cover;

the cover and the bottom cover are respectively connected to two sides of the metal middle frame, the screen component is connected to a side of the cover facing the bottom cover, and the circuit board is located in a space enclosed by the metal middle frame, the screen component, and the bottom cover;

the antenna bracket is disposed in an accommodating space that is jointly enclosed by an end of the screen component, an inner wall of the metal middle frame, and an inner wall of the cover;

the first antenna is disposed on the antenna bracket and comprises a first radiator and a second radiator, wherein the first radiator and the second radiator are disposed in the accommodating space at intervals, the first radiator is connected to the circuit board by a first feedpoint disposed on the first radiator, and the second radiator is connected to the circuit board by a second feedpoint disposed on the second radiator; and a second antenna is formed by the circuit board, the metal middle frame, and a slot between the circuit board and the metal middle frame.

2. The wearable device according to claim 1, wherein the antenna bracket is fastened to at least one of the metal middle frame or the cover.

3. The wearable device according to claim 1, wherein the antenna bracket comprises a bracket body and a cabling part, the bracket body is annular, the cabling part is disposed on a part of a length of the bracket body through protrusion, and a metal cable is disposed on the cabling part to form the first antenna.

4. The wearable device according to claim 3, wherein a height of the cabling part in a thickness direction of the wearable body is not less than a height of the metal middle frame.

5. The wearable device according to claim 3, wherein the antenna bracket further comprises an extension part, the extension part is formed by extending the bracket body in a direction of approaching the metal middle frame, a locking protrusion is disposed on the inner wall of the metal middle frame, and the extension part is glued between the cover and an upper surface of the locking protrusion.

6. The wearable device according to claim 1, wherein the first radiator is a global navigation satellite system (GNSS) antenna, the second radiator is a Bluetooth/Wireless Fidelity (BT/Wi-Fi) antenna.

7. The wearable device according to claim 1, wherein the first antenna is a metal cable plated on the antenna bracket, a metal piece built in the antenna bracket, a flexible printed circuit attached to the antenna bracket.

8. The wearable device according to claim 1, wherein the first antenna is fed by using a spring plate, a screw, or a metal sheet.

9. The wearable device according to claim 1, wherein a width of the first antenna is 0.6 mm to 0.8 mm.

10. The wearable device according to claim 1, wherein the circuit board is separately connected to a first ground point, a second ground point, and the metal middle frame by using a third feedpoint.

11. The wearable device according to claim 10, wherein the second antenna is at least one of a cell antenna or a global navigation satellite system (GNSS) antenna.

12. The wearable device according to claim 10, wherein a third ground point is disposed between the circuit board and the metal middle frame and located between the third feedpoint and the second ground point.

13. The wearable device according to claim 10, wherein the metal middle frame is grounded by using a tuning inductor or capacitor.

14. The wearable device according to claim 10, wherein a width of the slot is 0.5 mm to 1.8 mm.

15. The wearable device according to claim 1, wherein the antenna bracket comprises avoidance structure.

16. A wearable device, comprising a display, a first antenna, a metal middle frame, a circuit board, and a bottom cover; wherein the display and the bottom cover are respectively connected to two sides of the metal middle frame;

the circuit board is located in a space enclosed by the metal middle frame, the display, and the bottom cover;

the circuit board is separately connected to a first ground point, a second ground point, and the metal middle frame by a first feedpoint; and the first antenna is formed by the circuit board, the metal middle frame, and a slot between the circuit board and the metal middle frame.

17. The wearable device according to claim 16, wherein the first antenna is at least one of a cell antenna or global navigation satellite system (GNSS) antenna.

18. The wearable device according to claim 16, wherein a third ground point is disposed between the circuit board and the metal middle frame, and located between the first feedpoint and the second ground point.

19. The wearable device according to claim 16, wherein the metal middle frame is grounded by a tuning inductor or capacitor.

20. The wearable device according to claim 16, wherein the first antenna is fed by a spring plate, a screw, or a metal sheet.

* * * * *